Sept. 24, 1946.                T. McG. AIKEN                    2,408,184
                COMBINED LENS SUPPORT AND LENS HOOD FOR FOLDING CAMERAS
                      Filed Dec. 17, 1943           3 Sheets-Sheet 1

INVENTOR.
THOMAS McG. AIKEN.
BY Archworth Martin
his ATTORNEY.

Sept. 24, 1946.   T. McG. AIKEN   2,408,184
COMBINED LENS SUPPORT AND LENS HOOD FOR FOLDING CAMERAS
Filed Dec. 17, 1943   3 Sheets-Sheet 2
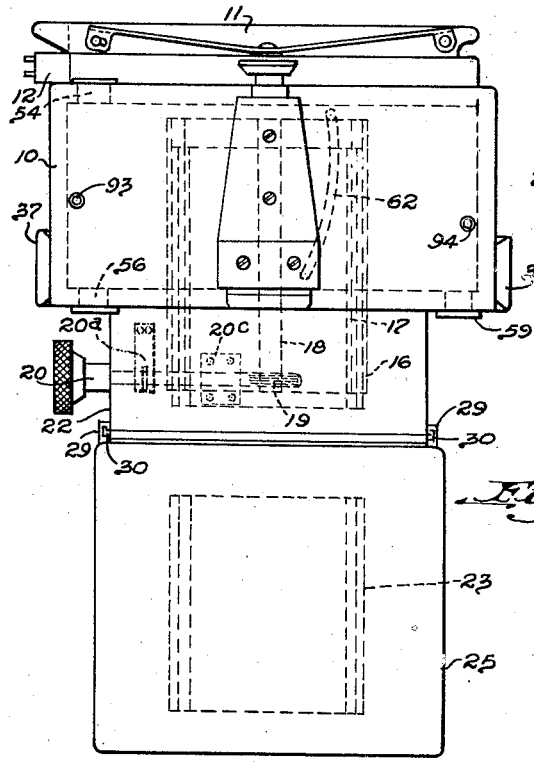
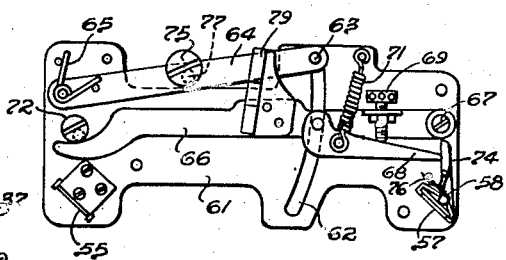
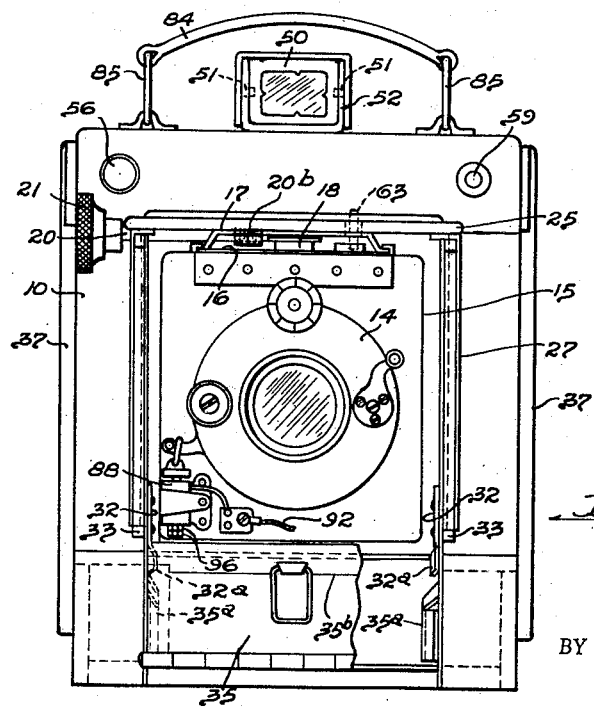
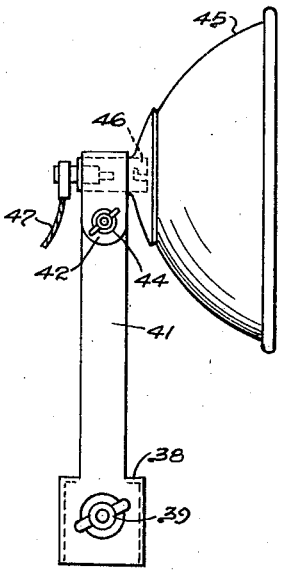
INVENTOR.
THOMAS McG. AIKEN.
BY Archworth Martin
his ATTORNEY.

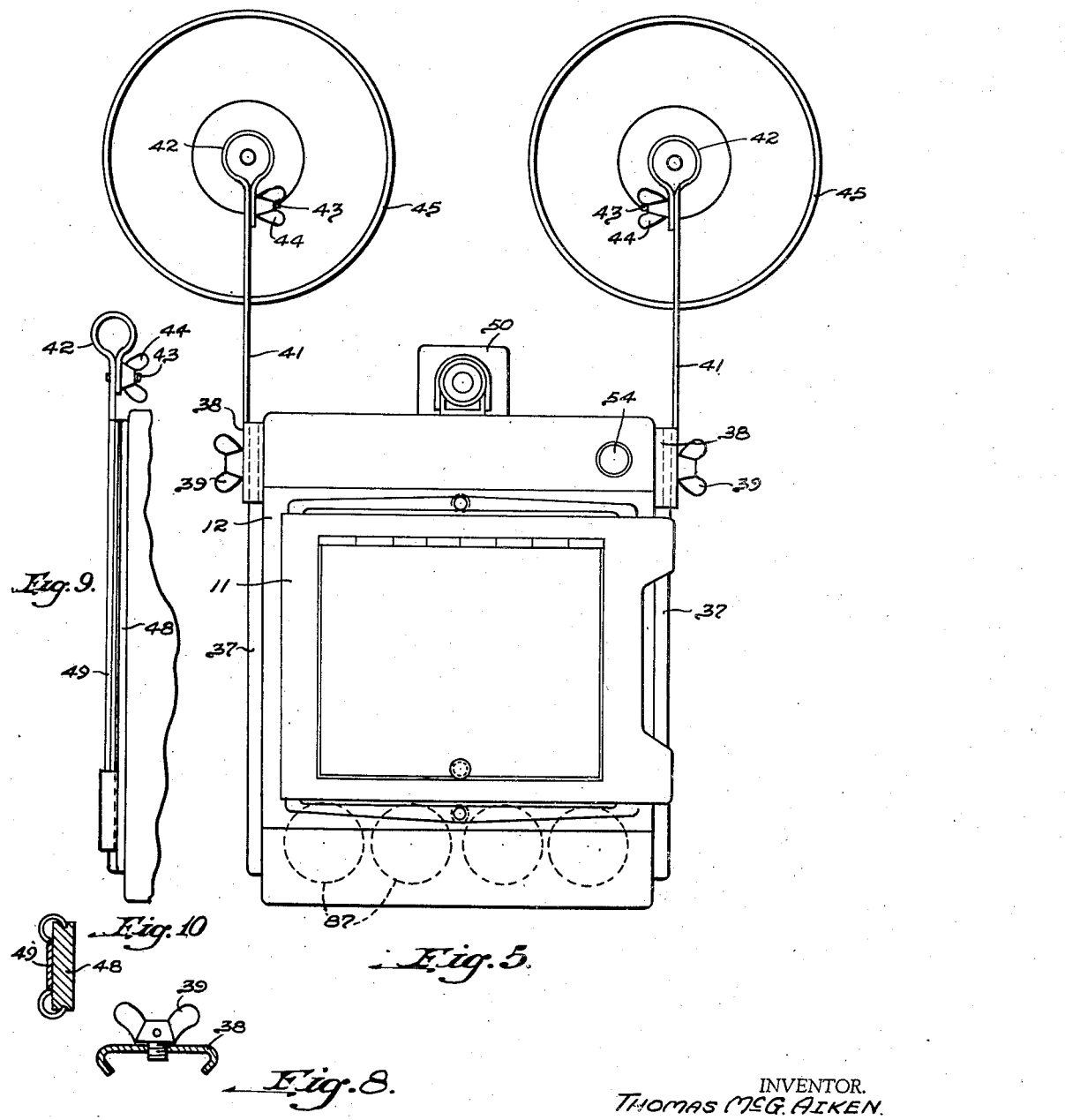

UNITED STATES PATENT OFFICE 2,408,184

COMBINED LENS SUPPORT AND LENS HOOD FOR FOLDING CAMERAS

Thomas McG. Aiken, Pittsburgh, Pa.

Application December 17, 1943, Serial No. 514,618

8 Claims. (Cl. 95—40)

In cameras of certain types, including "press" cameras, it has been common practice to mount a range finder on the top of the camera, that is automatically moved in accordance with focusing movements of the lens-carrying board, but since the hinged board on which the lens board is supported when in forwardly projected position is at the bottom of the camera, the linkage or lever mechanism required for this automatic adjustment of the range finder has to be of considerable length. Necessarily there is uncertain and perhaps excessive amount of looseness or lost motion in an arrangement of this nature, with consequent inaccuracies of range finder adjustment with respect to focusing adjustments.

My invention has for one of its objects the provision of a camera structure whereby the lens-carrying board is supported from above, by a suitable hanger that is adjustable along a guide member in the top of the camera box and a guide member on the under side of the hinged board that is located above the lens, in position to shield the lens and to support the lens board when it is in forwardly-projected positions.

Another object of my invention is to provide a handle arrangement for cameras of this type, which will enable the camera to be more conveniently held by the operator in the process of taking pictures, without danger of injury to the extended bellows, and without extending the overall dimensions of the camera structure to a substantial extent.

Another object of my invention is provide a camera of the type referred to and having a range finder, wherein the slidably-supported member for carrying the lens board is mounted in such proximity to the range finder that a shorter length of operating connections between the lens board and the range finder are required than in cameras of previously known forms.

Still another object of my invention is to provide a camera of the type referred, of generally improved form, in the way of operating mechanisms for focusing, and arrangements of view finder, range finder, and hood supporting element, and including various other advantageous features as hereinafter described.

Figure 1:
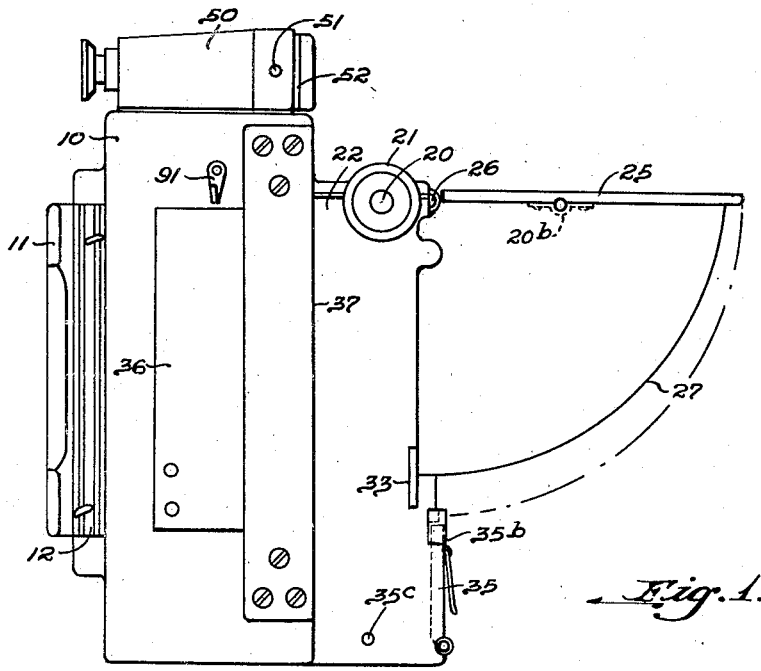
Figure 2:
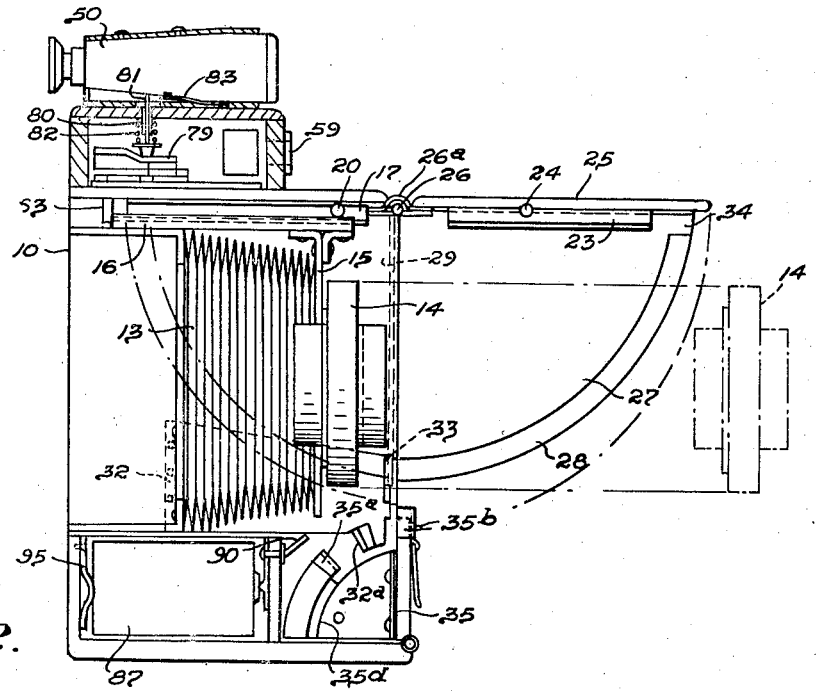

Figure 1 is a side view of the camera, with the front cover and hood in the open position; Fig. 2 is a vertical sectional view of a portion thereof; Fig. 3 is a plan view; Fig. 4 is a front view, with the hood raised; Fig. 5 is a rear view of the camera; Fig. 6 is a plan view of some portions of the range finder mechanism; Fig. 7 is a side view of one of the reflectors and lamp supports of Fig. 5; Fig. 8 is a sectional plan view of one of the lamp supports of Fig. 5; Fig. 9 shows a modification of one of these lamp supports, and Fig. 10 is a sectional view thereof.

The camera structure comprises a camera box 10, with the usual spring-held back member 11 for releasably maintaining a plate holder 12 in place at the rear side of the camera chamber. The usual bellows 13 and the lens and shutter unit 14 is mounted on the forward end of the bellows. A lens board or hanger 15 affords vertical support for the lens holder 14, through its connection with a slide member 16 that is slidably supported on a trackway 17. The front end of the bellows and the lens unit are thus suspended from above, instead of being supported from below. A rack 18 is secured to the upper side of the slide member 16 and is engaged by pinion teeth 19 on a shaft 20 that is insertible into the position shown in Fig. 4, through a hole in the side of a reduced extended portion 22 of the camera box, a bearing strap 20c, and the trackway 17. The shaft 20 has a knob 21 that is turned to shift the lens hanger 15 forwardly and rearwardly, when focusing. A spring-pressed detent 20a engages a circular notch in the shaft 20, to yieldably hold the shaft in place.

Focusing movement further forwardly than permitted by the limited length of the trackway 17 is effected through the use of a second trackway 23 which the slideway 16 will enter as it leaves the forward end of the trackway 17. This trackway 23 is secured to the under or inner side of a combined hood and front cover member 25, the shaft 20 being insertible through holes 24 in the track member and a bearing 20b to engage a forwardly-projected portion of the rack 18 when the lens is to be moved a considerable distance forwardly of the camera box, as indicated by dash lines in Fig. 2.

When the member 25 is in raised position, it serves as a hood to keep rain off the lens and to shield it from the sun, while in its folded-down position it serves as a cover for the front side of the camera box. The hood is hinged at 26 to the upper front corner of the camera box and carries wing members 27 that are of segmental form and have stiffening flanges 28. The wings also have hook-like flanges 29 (Figs. 2 and 3) that engage flanges 30 on the forward vertical edges of the box extension 22, to effect a seal against rain, when the hood 25 is raised. These wings not only serve as braces for holding the hood raised, but prevent rain and snow blowing sidewise against the lens. The flanges 28 also reduce danger of accidental damage to the forward edges of the wings.

The hood and its wings are releasably held in raised position by a latch 32 at each side of the box extension 22. The latches are of spring metal strips riveted to the inner sides of the box walls as shown in Figs. 2 and 4, and have their outer ends bent sidewise to form stops 33 that project outwardly through holes in the side walls of the box, so that they will snap behind the rear edges of the wings 27 and flanges 28, when the hood is raised. When pressed inwardly, the latches will release the wings and allow the hood to be closed. When the hood is closed down against the forward side of the box, the latches will snap into the spaces 34 between the flanges 28 and the hood member 25, to thereby releasably hold the cover closed. The release of the latches 33, to permit opening and closing of the hood is conveniently effected by swinging open a door 35 that closes a compartment in the lower portion of the camera box. This compartment will serve as a storage space for conductor wires that are connected to the lamp and solenoid to be hereinafter described, these wires necessarily being of considerable length to permit suitable range of adjustment of the lens board and will be tucked into the compartment when the lens board is drawn back. The latch plates 32 have inwardly bent lips 32a that serve as a camming surfaces which are engaged by camming members 35a of strip-like form which are carried by the door 35, so that when the door is swung outwardly, the surfaces 35a will move behind the surfaces 32a to flex the latch strips 32 inwardly, thus moving the latches 33 from engagement with the wing flanges 28. When the door 35 is open, the hood 25 can be swung down to closed position, as indicated by dash lines in Fig. 1, the wings 27 moving back along the sides of the camera box, as indicated by dash lines in Fig. 2. The door 35 will then be closed and a strip 35b on the door will close the crack or space between the adjacent edges of the hood and the door. Protuberances or studs 35c extending inwardly from the sides of the box will engage in recesses in yieldable wings 35d of the door 35 (Figs. 1 and 2) to frictionally hold the door closed. Rain and dust are excluded at the hinged upper or rear edge of the member 25, by cooperating semicircular shield elements 26a that are carried by the hood and the camera box, respectively.

The sides of the camera box 10 are recessed at 36, and these recesses are overlaid by bars 37 that serve as handles by which the camera can be held when taking pictures, the recesses being of a depth to accommodate the user's fingers. The arrangement gives the advantage of handles that are positioned for convenient support of the camera in approximately a balanced position, and the handles do not project so far outwardly as to unduly increase the overall width of the camera. With previous types of press cameras, and particularly when the lens is extended forwardly a considerable distance, the operator sometimes grasps the forward vertical edges of the camera box, in order to hold it more conveniently. In such cases, his fingers will sometimes scrape or tear the bellows. By my handle arrangement, this difficulty and such awkward holding of the camera is avoided.

The handles 37 are of dovetail form at their upper ends, to provide for detachable connection with a bracket 38 which carries a thumb screw 39 whereby the bracket can be set at various heights relative to the camera. The bracket carries a post 41 that is looped at 42 and has a screw 43 and a wing nut 44. The loop 42 carries a lamp socket 46 and a reflector 45. The socket has suitable terminals, one of which is connected to a conductor 47 and the other grounded through the post 41. The electrical circuit will be hereinafter described. Lamps can be positioned at either or both sides of the camera. Figs. 9 and 10 show a modified arrangement for vertically adjusting the lamps a distance equal to the lengths of the handles. Here the handle 48 has grooves in its edges that are frictionally gripped by bent flanges on the lower portion of the post 49 that corresponds to the posts 41. The lamp and reflector can thus be set at a desired vertical position simply by sliding the post along the handle.

The posts may be made of metal which can be bent and straightened as desired, to make sidewise adjustments of the lamp.

A range finder and a view finder are provided for the camera. The view finder 50 is pivotally supported at 51 on a bracket 52 that is mounted on the top of the camera. This finder is automatically tilted on its pivots during focusing, and the operator will look through the finder, before snapping the shutter, to see whether a desired part of the focused view is "framed" for the exposure, so that he can tilt or turn the camera to bring a desired object or area into accurate position on the sensitized plate.

As to the range finder apparatus, the operator will look through an opening 54 at the rear side of the camera box, and see a semitransparent reflector 55 one side of which is angularly exposed to a window 56 in front of the camera box. A surfaced mirror 57 is pivotally mounted in the box, at 58, for tilting movement on a vertical axis. The mirror 58 is exposed to a range finder opening 59 in the front wall of the box and images are reflected therefrom to the mirror 55 where they are to be superimposed on or matched with the view through the opening 54 and window 56.

The range finding mirror 57 is automatically adjusted through focusing movements of the lens board, by mechanisms which will now be described. A plate 61 is mounted in the top compartment of the camera box and has a slot 62 through which extends a stud 63 that is carried by a lever 64 and extends downward through the slot 62 and a slot in the top camera wall, and has abutting engagement with the rear edge of the slideway 16. The lever 64 is pivotally mounted on the plate 61 and is urged constantly forward by a spring 65 so that the stud 63 and the free end of the lever 64 will follow the slide 16 as the lens hanger 15 is moved forwardly when focusing.

A lever 66 is pivotally mounted at 67, on the plate 61 and has a second lever 68 pivotally mounted thereon. A set screw 69 serves as an adjustable stop for the lever 68, to adjust the position of the free end of the lever 68 relatively to the adjacent end of the lever 66. A spring 71 yieldably holds the lever 68 against the stop 69 and thereby also holds the lever 66 against a washer-like cam 72 that is frictionally held but rotatably adjustable on the plate 61. The adjustment of the lever 68 on its pivot will vary the throw and angular position of the mirror 67, since the lever will be adjusted along the arm 74 of the mirror-supporting bracket.

When the camera lens is shifted forwardly, the stud 63 and the lever 64 will follow the same, under the influence of the spring 65. When it has been thus moved a predetermined distance, a rotatably-adjustable cam disc 75 on the upper side of the lever comes into abutting engagement with the lever 66, thus rocking said lever about its pivot 67 (against the tension of the spring 71) and thrusting the lever 68 in a generally lengthwise direction against the bracket arm 74 to rock the mirror 57 in a clockwise direction against the tension of a spring 76. That stage in the forward movement of the lever 64 at which it will pick up and shift the lever 66 is determined by the adjustment of the disc 75 on its pivot 77. In some instances, it will be desired to delay angular movements of the mirror 57 until after the lens hanger has been moved a greater distance, than at other times. If the disc 75 is adjusted 180° from the position shown in Fig. 6, movement of the lever 63 will be started simultaneously with forward movement of the lever 64. The adjustments referred to enable the range finder mechanism to be used with camera lenses of various focal lengths.

A camming bar 79 is carried by the lever 66, so that upon forward movements of the lever and consequent angular changes of the mirror 57, the view finder 50 will be tilted on its pivots 51. Forward movement of the cam bar causes it to lift a rod or post 81 that extends through a guide sleeve 80 in the upper wall of the range finder case and is biased downwardly by a spring 82, the spring, of course, causing the post to follow the sloping cam surface when the lever 66 is returned to its retracted position. A leaf spring 83, secured at its ends to the view finder 50 and the base plate of the view finder, biases the finder counterclockwise on its pivots, so it will not stick in a raised position when the post 81 is moved down.

A strap-like carrying handle 84 for the camera is loosely connected to the camera box by the usual handle rings 85.

In the lower rear portion of the camera box, a compartment is provided for battery cells 87 used in energizing the lamps 45 and a solenoid 88 for tripping the camera shutter. The battery cells will preferably be connected in series, in the usual manner. At one end of the series a conductor 90 (Fig. 2) will lead to a switch in the box, at 91 (Fig. 1) where connection is made with a conductor 92 (Fig. 4) for the solenoid. Conductors will also lead from the switch to sockets 93 and 94 (Fig. 3) into which jack plugs for the lamp conductors 47 may be inserted when using lamps.

The switch 91 can conveniently be actuated by the thumb of the operator while he is grasping the adjacent handle 37, to close the circuit for the shutter-operating solenoid 88, and to also close the circuit through the lamps, if they are plugged in at 93—94. The lamps and the solenoid are grounded through the framework or other metal parts of the camera, to complete electrical connection with the battery, as at 95 (Fig. 2). A switch as 91 can, of course, be provided also at the other side of the camera box.

Adjustment of the solenoid armature is provided by nuts 96, to vary the time required for actuation of the shutter after the switch is closed, and hence the timing thereof with respect to the energization of the flash lamps.

I claim as my invention:

1. The combination with a camera box having a bellows and a lens hanger on the forward end of the bellows, of a hood member pivotally connected to the upper forward corner of the box and movable against the forward side of the box to serve as a closure therefor, guide members on the box and the hood member, wing-like shield members of segmental plate form connected to the side edges of the hood member throughout substantially its entire length, in position to extend downward and rearwardly therefrom when the hood is raised and to lie along side the vertical sides of the camera box when the hood member is in closed position, means for releasably latching the rear edges of the shield members at their lower ends, to hold the hood in raised position, and means for adjusting the hanger on said guide members in forward and rearward directions.

2. The combination with a camera box having a bellows and a lens hanger on the forward end of the bellows, of a hood member pivotally connected to the upper forward corner of the box and movable against the forward side of the box to serve as a closure therefor, means in the box for supporting the lens hanger for movement beyond the forward end of the box, wing-like shield elements carried by the side edges of the hood member, in position to depend therefrom when the hood is raised, the side walls of the camera box having recesses that are open forwardly and laterally, and handles overlying the recesses and secured to the box walls, the said wings being movable into the recesses in close proximity to the side walls of the recesses, when the hood is lowered, there being clearance between the wings and the handles, for the user's fingers.

3. The combination with a camera box having a bellows mounted thereon and a lens hanger on the forward end of the bellows, the box being open at its forward end for extension of the bellows, of a hood member pivotally connected to the upper forward corner of the box and movable against the box to serve as a closure for the opening, wing-like shield members of segmental plate form connected at their forward radial edges to the side edges of the hood member throughout the major portion of its length, in position to extend downwardly and rearwardly therefrom when the hood is raised and to lie adjacent to the vertical sides of the camera box when the hood member is in closed position, means on the hood member for supporting the lens hanger at longitudinally-adjusted positions, and means adjacent to the lower forward corner of the box for latching the hood member in its raised position, the rear edges of the shield members extending vertically along the major portion of the sides of the box opening, when the hood is raised.

4. The combination with a camera box having a bellows and a lens hanger on the forward end of the bellows, of a hood member pivotally connected to the upper forward corner of the box and movable against the forward side of the box to serve as a closure therefor, guide members on the box and the hood member, wing-like shield members of segmental plate form having forward radial edges respectively connected to side edges of the hood member and their rearmost radial edges bent to have hooked engagement with flanges on the forward vertical edges of the camera box, when the hood is in raised position, and a latch adjacent to the lower forward corner of the camera box engageable with the rearmost edges of the shield members, to releasably hold the hood in its raised position.

5. The combination with a camera box having a bellows and a lens hanger on the forward end of the bellows, of a hood member pivotally connected to the upper forward corner of the box and movable against the forward side of the box to serve as a closure therefor, guide members on the box and the hood member, wing-like shield members of segmental plate form having forward radial edges respectively connected to side edges of the hood member and their rearmost radial edges bent to have hooked engagement with flanges on the forward vertical edges of the camera box, when the hood is in raised position, a latch on the camera box engageable with the rearmost edges of the shield members, at their lower ends, to releasably hold the hood in its raised position and engageable with a stop surface at a forward edge of one wing member, to hold the hood in folded position against the forward side of the camera box.

6. The combination with a camera box having a bellows and a lens hanger on the forward end of the bellows, of a hood member pivotally connected to the upper forward corner of the box and movable against the forward side of the box to serve as a closure therefor, guide members on the box and the hood member, for supporting the lens hanger, wing-like shield members of segmental plate form having their forward radial edges respectively connected to side edges of the hood member and their rearmost radial edges bent to have hooked engagement with flanges on the forward vertical edges of the camera box, when the hood is in raised position, and latches adjacent to the lower forward corner of the box and movable into the position behind the rear edges of the shield members to releasable maintain them in projected postion.

7. The combination with a camera box having a bellows and a lens hanger on the forward end of the bellows, of a hood member pivotally connected to the upper forward corner of the box and movable against the forward side of the box to serve as a closure therefor, guide members on the box and the hood member for supporting the hanger, wing-like shield members having forward radial edges respectively connected to the sides of the hood member throughout the major portion of their length, and having rear radial edges at the box sides, that portion of each shield between its radial edges having laterally-bent flanges, and latch devices engageable with lower rear portions of the shields for releasably maintaining them in projected position relative to the box.

8. The combination with a camera box having a bellows and a lens hanger on the forward end of the bellows, of a hood member pivotally connected to the upper forward corner of the box and movable against the forward side of the box to serve as a closure therefor, guide members on the box and the hood member for supporting the hanger, wing-like shield members having forward radial edges respectively connected to the sides of the hood member throughout the major portion of its length, and having rear radial edges at the box sides, that portion of each shield between its radial edges having laterally-bent flanges, and latch devices engageable with the ends of said flanges to releasably hold the hood member and the shield members in their projected and retracted positions relative to the box.

THOMAS McG. AIKEN.